(12) United States Patent
Choi et al.

(10) Patent No.: US 10,467,037 B2
(45) Date of Patent: Nov. 5, 2019

(54) STORAGE DEVICE AND USER DEVICE SUPPORTING VIRTUALIZATION FUNCTION

(71) Applicant: Samsung Electronics Co., Ltd., Suwon-si, Gyeonggi-do (KR)

(72) Inventors: Kwangho Choi, Seoul (KR); Taehack Lee, Hwaseong-si (KR); Sangkyoo Jeong, Seoul (KR); Yongtae Jeon, Pohang-si (KR); Kijo Jung, Gwacheon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 169 days.

(21) Appl. No.: 15/003,031

(22) Filed: Jan. 21, 2016

(65) Prior Publication Data

US 2016/0224248 A1    Aug. 4, 2016

(30) Foreign Application Priority Data

Feb. 4, 2015    (KR) .................. 10-2015-0017512

(51) Int. Cl.
*G06F 12/00* (2006.01)
*G06F 9/455* (2018.01)

(52) U.S. Cl.
CPC .............. *G06F 9/45558* (2013.01); *G06F 2009/45579* (2013.01); *G06F 2009/45583* (2013.01)

(58) Field of Classification Search
CPC .. G06F 3/0604; G06F 9/45558; G06F 3/0659; G06F 3/0688; G06F 3/0664; G06F 2009/45583; G06F 2009/45579; G06F 3/06; G06F 9/455

USPC .......................................... 711/154, 202, 203
See application file for complete search history.

(56) References Cited

U.S. PATENT DOCUMENTS

| | | | |
|---|---|---|---|
| 7,679,133 | B2 | 3/2010 | Son et al. |
| 7,958,298 | B2 | 6/2011 | Deshpande et al. |
| 8,122,225 | B2 | 2/2012 | Recio et al. |
| 8,239,655 | B2 | 8/2012 | Goggin et al. |
| 8,346,997 | B2 | 1/2013 | Freimuth et al. |
| 8,473,947 | B2 | 6/2013 | Goggin et al. |
| 8,489,699 | B2 | 7/2013 | Goggin et al. |
| 8,495,252 | B2 | 7/2013 | Lais et al. |
| 8,521,941 | B2 | 8/2013 | Regula |
| 8,543,754 | B2 | 9/2013 | Glass et al. |
| 8,553,466 | B2 | 10/2013 | Han et al. |
| 8,559,235 | B2 | 10/2013 | Yoon et al. |
| 8,654,587 | B2 | 2/2014 | Yoon et al. |
| 8,683,110 | B2 | 3/2014 | Suzuki et al. |
| 9,537,710 | B2 * | 1/2017 | Shankar ............... G06F 11/2028 |
| 9,886,405 | B1 * | 2/2018 | Johnson ............... G06F 13/387 |
| 2011/0233648 | A1 | 9/2011 | Seol et al. |
| 2013/0097600 | A1 * | 4/2013 | Cardona ............. G06F 9/45558 718/1 |

(Continued)

*Primary Examiner* — Pierre Miche Bataille
(74) *Attorney, Agent, or Firm* — Harness, Dickey & Pierce, P.L.C.

(57) ABSTRACT

A storage device includes a plurality of nonvolatile memories; and a storage controller which is connected to the nonvolatile memories and controls the nonvolatile memories, wherein the storage controller is configured to, perform an interface operation on the basis of a queue-based command exchange scheme with a host, and access administrator queue information corresponding to each of a plurality of virtualization functions of the host.

16 Claims, 13 Drawing Sheets

(56) References Cited

U.S. PATENT DOCUMENTS

| | | | |
|---|---|---|---|
| 2014/0280666 A1* | 9/2014 | Cardona | H04L 67/1097 709/212 |
| 2014/0281040 A1 | 9/2014 | Liu | |
| 2014/0337540 A1* | 11/2014 | Johnson | G06F 13/14 710/5 |
| 2015/0169341 A1* | 6/2015 | Gulati | G06F 9/45533 718/1 |
| 2015/0317088 A1* | 11/2015 | Hussain | G06F 3/0664 711/103 |
| 2016/0147676 A1 | 5/2016 | Cha et al. | |
| 2016/0306580 A1* | 10/2016 | Pinto | G06F 3/0631 |
| 2017/0177216 A1* | 6/2017 | Freyensee | G06F 3/061 |

* cited by examiner

STORAGE DEVICE AND USER DEVICE SUPPORTING VIRTUALIZATION FUNCTION

CROSS-REFERENCE TO RELATED APPLICATIONS

This U.S. non-provisional patent application claims priority under 35 U.S.C. § 119 to Korean Patent Application No. 10-2015-0017512, filed on Feb. 4, 2015 in the Korean Intellectual Property Office (KIPO), the entire contents of which are incorporated herein by reference.

BACKGROUND

At least one example embodiment of the inventive concepts relates to a storage device and a user device, and more particularly, to storage and user devices supporting a virtualization function.

There is a solid state drive (SSD) as a typical example of a data storage device based on a flash memory device. Examples of an interface being used in a data storage device such as a SSD include a serial AT attachment (SATA), a peripheral component interconnect express (PCIe), a serial attached small computer system interface (SCSI) (SAS), etc. Performance of a SSD is gradually being improved while the quantity of data being processed gradually increases. However, since a conventional interface such as a SATA may not be an interface specialized for a data storage device such as a SSD in comparison to other interfaces, performance of SATA may be limited. As a result, the nonvolatile memory express (NVMe) specification has been generated as part of an effort to make a standardized interface suitable for a SSD. The NVMe is an interface of a register level that performs a communication between a data storage device such as SSD and host software. The NVMe is based on a conventional PCIe bus and is an interface designed or, alternatively, optimized for a SSD.

As a semiconductor manufacturing technology develops, an operation speed of a host device such as a computer, a smart phone, a smart pad, etc. is being improved. As an operation speed of a host device is improved, a virtualization of driving a variety of virtualization functions in one host device is being introduced. However, since at least some implementations of conventional NVMe are designed without considering a virtualization, at least some conventional implementations of NVMe are limited with respect to supporting the virtualization function.

SUMMARY

At least some example embodiments of the inventive concepts provide a storage device. The storage device may include a plurality of nonvolatile memories and a storage controller which is connected to the nonvolatile memories and controls the nonvolatile memories. The storage controller performs an interface operation on the basis of a queue based command exchange scheme with a host and accesses a plurality of administrator queue information corresponding to each of virtualization functions of the host.

At least some example embodiments of the inventive concepts also provide a user device supporting a virtualization function. The user device may include a host core including at least one physical function and at least one virtual function and a host memory that operates as a working memory with respect to the host core. The host memory stores at least one pair of virtual function administrator queue corresponding to the at least one virtualization function.

According to at least some example embodiments of the inventive concepts, a storage device includes a plurality of nonvolatile memories; and a storage controller which is connected to the nonvolatile memories and controls the nonvolatile memories, wherein the storage controller is configured to, perform an interface operation on the basis of a queue-based command exchange scheme with a host, and access administrator queue information corresponding to each of a plurality of virtualization functions of the host.

The storage controller may include a plurality of fetchers that correspond, respectively, to the plurality of virtualization functions, each one of the plurality of fetchers being configured to fetch administrator submission queue information of the corresponding virtual function and input/output submission queue information of the corresponding virtualization function.

The plurality of fetchers may be configured such that, in response to a doorbell signal received from the host, the plurality of fetchers access a host memory of the host, wherein, for each one of the plurality of fetchers, the host memory accessed is a memory storing the administrator submission queue information of the corresponding virtual function and the input/output submission queue information of the corresponding virtual function.

The storage controller may further include a plurality of parsers connected to the plurality of fetchers, the plurality of parsers being configured to analyze administrator submission queue information corresponding to the plurality of fetchers and input/output submission queue information, corresponding to the plurality of fetchers.

The storage controller may further include a dispatcher connected to the plurality of parsers in common; and a plurality of cores, wherein the dispatcher is configured to receive a plurality of administrator submission queue information or a plurality of input/output submission queue information from the parsers and allocate the administrator submission queue information or the input/output submission queue information to the cores so that the cores operate in parallel.

The storage controller may further include a DMA unit configured to control read and write operations; and a plurality of cache memories connected to the plurality of cores respectively, wherein the cache memories include command information for controlling administrator submission queue information or input/output submission queue information allocated to a corresponding core to be processed by the DMA unit.

The storage controller may further include a DMA unit configured to control a processing operation with respect to the administrator submission queue information or the input/output submission queue information; and a common source response manager connected to the DMA unit, wherein the common response manager is configured to receive a plurality of administrator completion queues including information about a processing result of the administrator submission queue information or a plurality of input/output completion queues including information about a processing result of the input/output queue information from the DMA unit.

The storage controller may further include a plurality of responsers connected to the common response manager, the plurality of responsers corresponding to the plurality of virtualization functions of the host respectively, wherein the common response manager distributes the administrator completion queues or the input/output completion queues to corresponding responsers among the plurality of responsers.

The responsers may be configured to write information about the administrator completion queue or information about the input/output completion queue received from the common response manager in the host memory of the host.

The storage controller may be configured to perform an interface operation with respect to the host by a NVMe scheme.

The host may be configured to implement the plurality of virtualization functions by a SR-IOV scheme.

The storage controller may include a plurality of fetchers configured to fetch administrator submission queue information or input/output submission queue information with respect to the plurality of virtualization functions, wherein at least one of the plurality of fetchers is configured to fetch an administrator submission queue or an input/output submission queue with respect to at least two virtualization functions among the plurality of virtualization functions.

The storage controller may further include a plurality of fetchers configured to fetch administrator submission queue information or input/output submission queue information with respect to the plurality of virtualization functions; and a register including address information of a host memory with respect to the administrator submission queue information or the input/output submission queue information.

The register may store a producer index corresponding to the administrator submission queue information or a producer index and a completion index corresponding to the input/output submission queue information.

At least one of the plurality of nonvolatile memories may be a three-dimensional nonvolatile memory.

According to at least some example embodiments of the inventive concepts, a host device includes at least one processing core configured to implement a physical function and a plurality of virtual functions in accordance with an I/O virtualization (IOV) scheme; a memory storing a plurality of administrator queue areas, the plurality of administrator queue areas including, for each function from among the plurality of functions and the physical function, respectively, at least one administrator queue; and a root complex configured to connect the at least one processing core to the memory.

The plurality of administrator queue areas may include, for each function from among the plurality of functions and the physical function, respectively, at least one administrator submission queue and one administrator completion queue.

The IOV scheme may be a single root IOV (SR-IOV) scheme.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
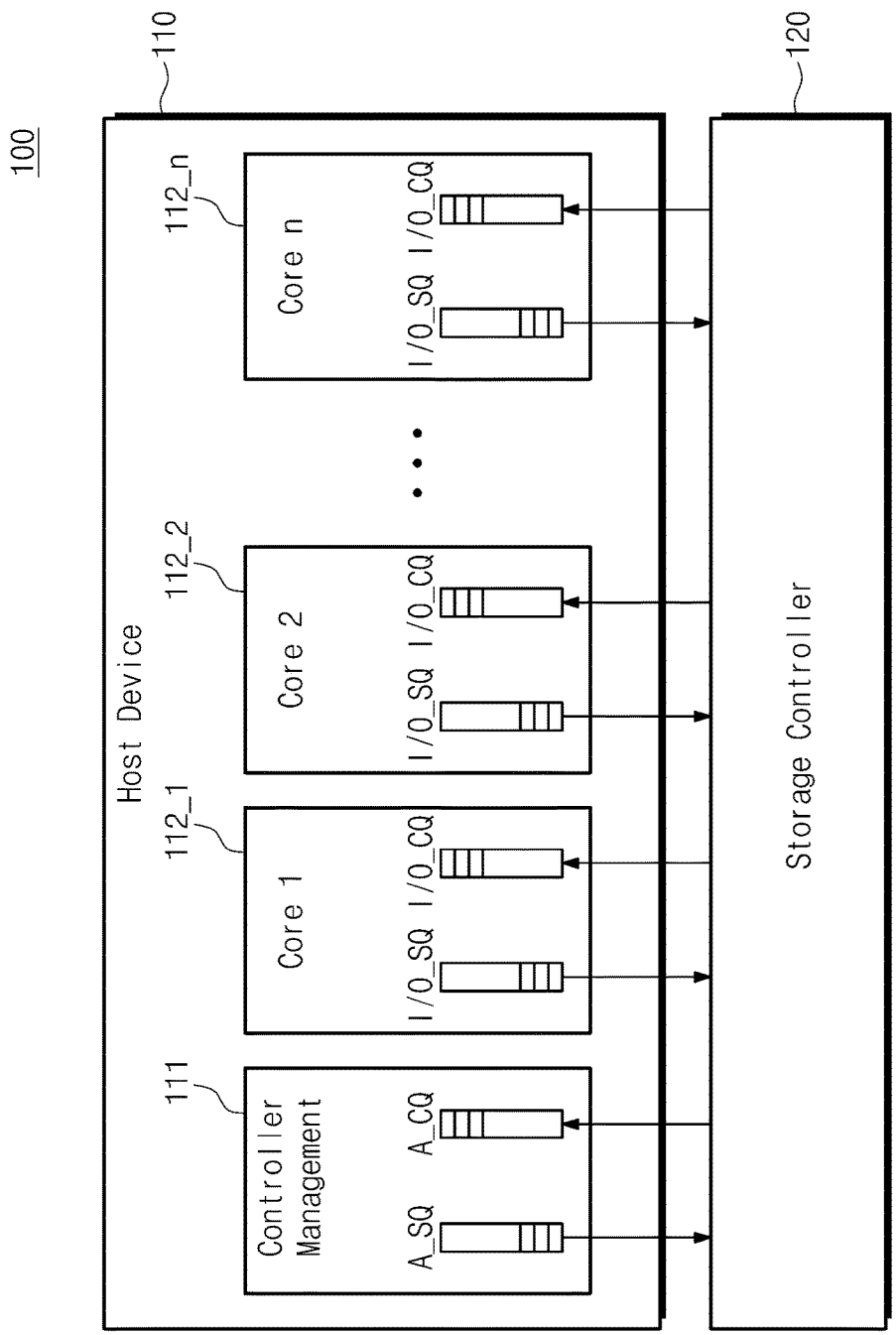
FIG. 1 is a block diagram illustrating a memory system supporting a queue based command interface scheme.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein; the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and groups thereof.

It should also be noted that in some alternative implementations; the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and in a two-dimensional pattern.

FIG. 1 is a block diagram illustrating a memory system 100 supporting a queue based command interface scheme. Referring to FIG. 1, the memory system 100 includes a host device 110 and a storage controller 120. The host device 110 includes a controller manager 111 and a plurality of cores 112_1~112_n. The controller manager 111 and plurality of cores 112_1~112_n may be implemented by one or more processors.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

As is well known, the queue based command interface scheme includes, for example, a scheme according to a NVMe protocol and a scheme according to a PCIe queuing interface (PQI) protocol. According to that protocol scheme a storage controller performs an interface operation based on a queue based command transaction to interface with host.

The queue based command interface scheme is described in detail below taking the NVMe protocol for example. The NVMe protocol scheme performs an interface operation based on a queue pair composed of a submission queue SQ for a command request and a completion queue CQ for a CMD response (a response to a result of a corresponding command request). The NVMe protocol scheme also has a pair of AQs (administrator queues) for a management of storage controller such as a format, a reset, a queue creation, etc. and pairs of input/output queues for a data transaction and a data management such as data write and data read operations.

For example, as illustrated in FIG. 1, the controller manager 111 performs an interface operation based on a pair of AQ (administrator queue) composed of an A_SQ (administrator submission queue) and an A_CQ (administrator completion queue). Each of the cores 112_1~112_n performs an interface operation based on a pair of input/output queues composed of an I/O_SQ (input/output submission queue) and an IO_CQ (input/output completion queue).

At least some interface schemes according to a NVMe protocol illustrated in FIG. 1 and interface schemes according to a PQI protocol are incapable of supporting a virtualization function. However, as an improvement of core performance and the need to effectively share limited physical hardware increase, the need to support a virtual function increases also in an interface scheme according to a NVMe or PQI protocol.

Accordingly, memory systems will be described in further detail below which support both a virtual function and a queue based command interface scheme in accordance with at least one example embodiment of the inventive concepts.

Figure 2:
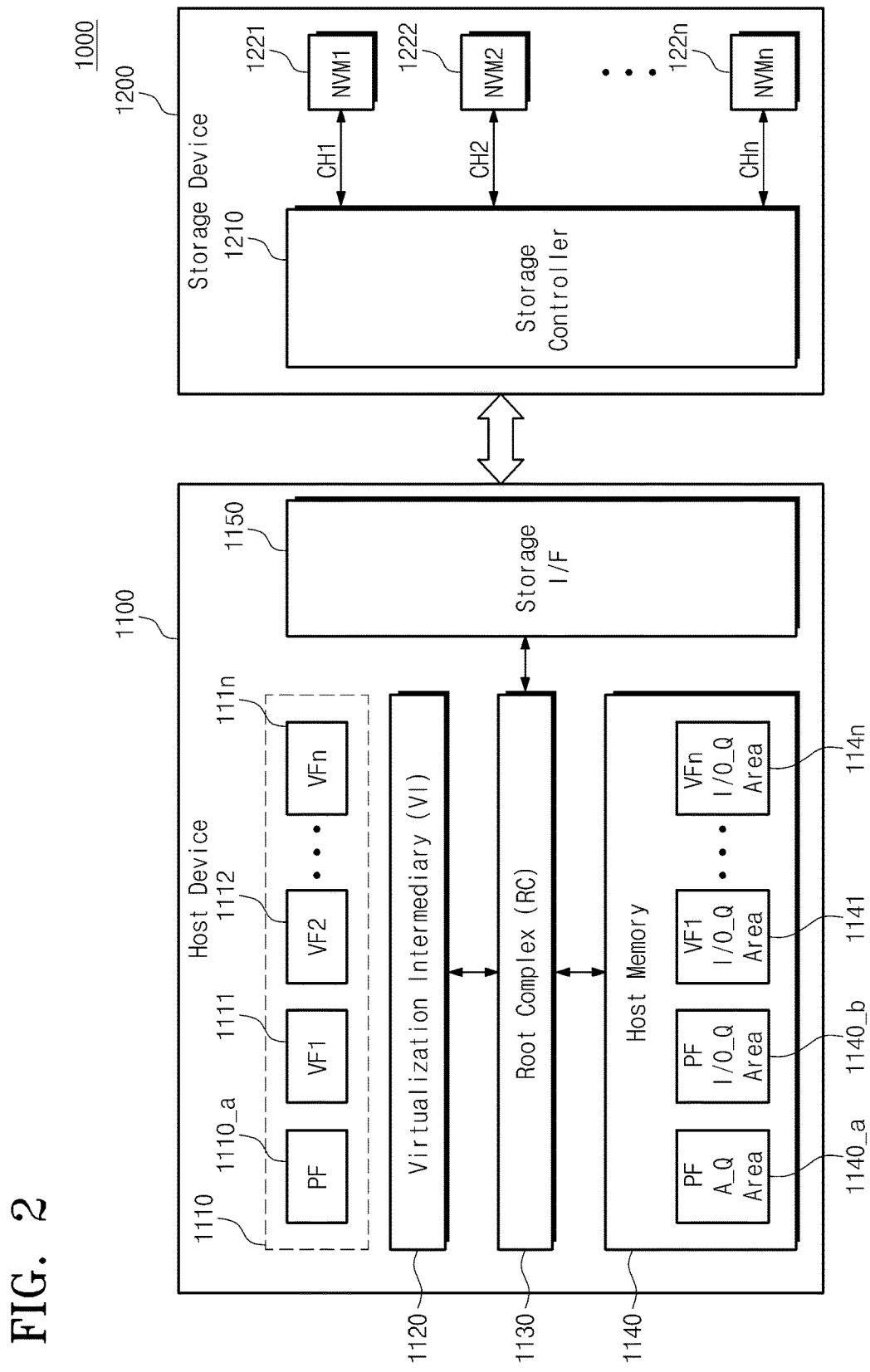
FIG. 2 is a block diagram illustrating an example of a memory system supporting a virtual function in accordance with at least one example embodiment of the inventive concepts.

FIG. 2 is a block diagram illustrating an example of a memory system 1000 supporting a virtual function in accordance with at least one example embodiment of the inventive concepts. The memory system 1000 of FIG. 2 can support a virtual function while supporting a queue based command interface scheme. For example, the memory system 1000 can support a virtual function of a SR-IOV (single-root IO virtualization) while supporting an interface scheme according to the NVMe protocol. Referring to FIG. 2, the memory system 1000 includes a host device 1100 and a storage device 1200.

The host device 1100 includes a host core 1110, a VI (virtualization intermediary) 1120, a RC (root complex) 1130, a host memory 1140 and a storage interface 1150. The host core 1110 may be a processor or be implemented by a processor. For example, the term "core" as used herein may refer to a processor core.

According to at least one example embodiment of the inventive concepts, either or both of the virtualization intermediary 1120 and root complex 1130 may include or be implemented by one or more circuits or circuitry (e.g., hardware) specifically structured to carry out some or all of the operations described herein as being performed by either or both of the virtualization intermediary 1120 and root complex 1130 (or an element thereof). According to at least one example embodiment of the inventive concepts, either or both of the virtualization intermediary 1120 and root complex 1130 may include or be implemented by a memory and one or more processors (e.g., host core 1110) executing computer-readable code (e.g., software) that is stored in the memory and includes instructions corresponding to some or all of the operations described herein as being performed by either or both of the virtualization intermediary 1120 and root complex 1130 (or an element thereof). According to at least one example embodiment of the inventive concepts, either or both of the virtualization intermediary 1120 and root complex 1130 may be implemented by, for example, a combination of the above-referenced hardware and processor executing software.

The host core 1110 includes a PF (physical function) 1110_a and a plurality of VFs (virtual function) 1111~111n. The physical function 1110_a may be a core or a processor as physical hardware. Each of the VFs 1111~111n may be a virtualization core or a processor generated by a virtualization operation of the SR-IOV. Each of the VFs 1111~111n can drive an OS (operating system) or an application independently. An OS (operating system) being driven by a virtual function may be called, for example, a guest OS.

The virtualization intermediary 1120 is connected to the host core 1110 and the root complex 1130 and performs a function of executing the virtualization functions 1111~111n or managing the virtualization functions 1111~111n. For example, the virtualization intermediary 1120 can perform a function of transmitting and managing address information for a virtualization operation of the SR-IOV.

The root complex 1130 represents a root of a hierarchy. The root complex 1130 is connected to the virtualization intermediary 1120, the host memory 1140 and the storage interface 1150. The root complex 1130 can perform a function of connecting the host core 1110 to the host memory 1140 or connecting the host core 1110 and the host memory 1140 to the storage interface 1150.

The host memory 1140 is connected to the virtualization intermediary 1120, the host core 1110 and the storage interface 1150 through the root complex 1130. The host memory 1140 may be used as a working memory for the physical function 1110_a or each of the virtualization functions 1111~111n in the host core 1100. For example, an application program, a file system and a device driver may be loaded into the host memory 1140.

As another alternative, the host memory 1140 may be used as a buffer for transmitting data to the storage device 1200 or temporarily storing data received from the storage device 1200. The host memory 1140 may be embodied by a volatile memory such as a SRAM (static RAM), a SDRAM (synchronous DRAM), etc. or a nonvolatile memory such as a PRAM (phase change RAM), a MRAM (magnetic RAM), a RRAM (resistive RAM), a FRAM (ferroelectric RAM), etc. or combinations thereof.

The storage interface 1150 is connected to the root complex 1130 and provides a communication between the host device 1100 and the storage device 1200. For example, the storage interface 1150 may provide queue based commands and data to the storage device 1200 or receive information of commands and data processed by the storage device 1200 according to the NVMe protocol scheme.

The storage device 1200 may store data provided from the host device 1100 or provide the stored data to the host device 1100. The storage device 1200 includes the storage controller 1210 and a plurality of nonvolatile memories 1221~122n. According to at least one example embodiment of the inventive concepts, the storage controller 1210 may include or be implemented by one or more circuits or circuitry (e.g., hardware) specifically structured to carry out some or all of the operations described herein as being performed by the storage controller 1210 (or an element thereof). According to at least one example embodiment of the inventive concepts, the storage controller 1210 may include or be implemented by a memory and one or more processors executing computer-readable code (e.g., software) that is stored in the memory and includes instructions corresponding to some or all of the operations described herein as being performed by the storage controller 1210 (or an element thereof). According to at least one example embodiment of the inventive concepts, the storage controller 1210 may be implemented by, for example, a combination of the above-referenced hardware and processor executing software.

The storage controller 1210 communicates with the host device 1100 through the queue based interface scheme. The storage controller 1210 can control the storage device 1200 to store data in at least one among the nonvolatile memories 1221~122n according to a command received from the host device 1100. The storage controller 1210 can control the storage device so that data stored in the nonvolatile memories 1221~122n is transmitted to the host device 1100.

The nonvolatile memories 1221~122n are connected to the storage controller 1210 through corresponding channels CH1~CHn respectively. Each of the nonvolatile memories 1221~122n performs an operation of storing data or reading out stored data under the control of the storage controller 1210. Each of the nonvolatile memories 1221~122n may be embodied by a nonvolatile memory such as a flash memory, a PRAM, a MRAM, a RRAM, a FRAM, etc. or in the form of combinations thereof.

At least one of the nonvolatile memories 1221~122n may be embodied by a three-dimensional nonvolatile memory device. For example, in a memory cell array of at least one of the nonvolatile memories 1221~122n, a plurality of word lines may be vertically stacked and a channel of each cell string may be vertically formed. A nonvolatile memory in which a memory cell array having that cell string structure is formed may be called a vertical-structure nonvolatile memory or a three-dimensional structure nonvolatile memory. In a memory device in which a cell string is formed in a horizontal direction or in a vertical direction, each memory cell may be driven by a multi level cell MLC.

The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

According to at least one example embodiment of the inventive concepts, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

According to at least one example embodiment of the inventive concepts, the host memory 1140 can provide a storage area of a queue command for supporting a virtual function while supporting the queue based interface scheme. That is, the host memory 1140 can separately provide an area for storing a queue command to support the queue based command interface scheme including a virtualization function.

For example, as illustrated in FIG. 2, to support a SR-IOV virtual function in the NVMe protocol interface scheme, the host memory 1140 can provide a PF administrator queue storage area PF A_Q Area 1140_a for storing an AQ (administrator queue) of the physical function 1110_a, a PF input/output queue storage area PF I/O_Q Area 1140_b for storing an input/output queue of the physical function 1110_a, and a plurality of VF input/output queue storage areas VF1 I/O_Q Area~VFn I/O_Q Area 1141~114n for storing input/output queues of the virtualization functions. For example, the queue commands may be stored in each storage area using a circular queue scheme mainly used in the NVMe protocol interface scheme.

In the memory system 1000 of FIG. 2, only an administrator queue corresponding to the physical function 110_a exists and administrator queues corresponding to each of the virtualization functions 1111~111n do not separately exist. Since an administrator queue is not separately allocated with respect to each of the virtualization functions 1111~111n, a guest OS of each of the virtualization functions 1111~111n or the virtualization intermediary 1120 may be required to access an administrator queue of the physical function 1110_a stored in the PF administrator queue storage area PF A_Q Area 1140_a whenever processing VF input/output queues VF1 I/O_Queue~VFn I/O_Queue of the virtualization functions. When a guest OS of each of the virtualization functions 1111~111n or the virtualization intermediary 1120 has to access the same administrator queue to execute not only operations for the physical function 1110_a but also operations of the virtualization functions 1111~111n, overall, performance of the memory system 1000 is degraded.

To solve that problem, an embodiment of a memory system will be described which separately includes a virtual function administrator queue corresponding to each virtual function and is capable of storing and processing a corresponding independent virtual function administer queue.

Figure 3:
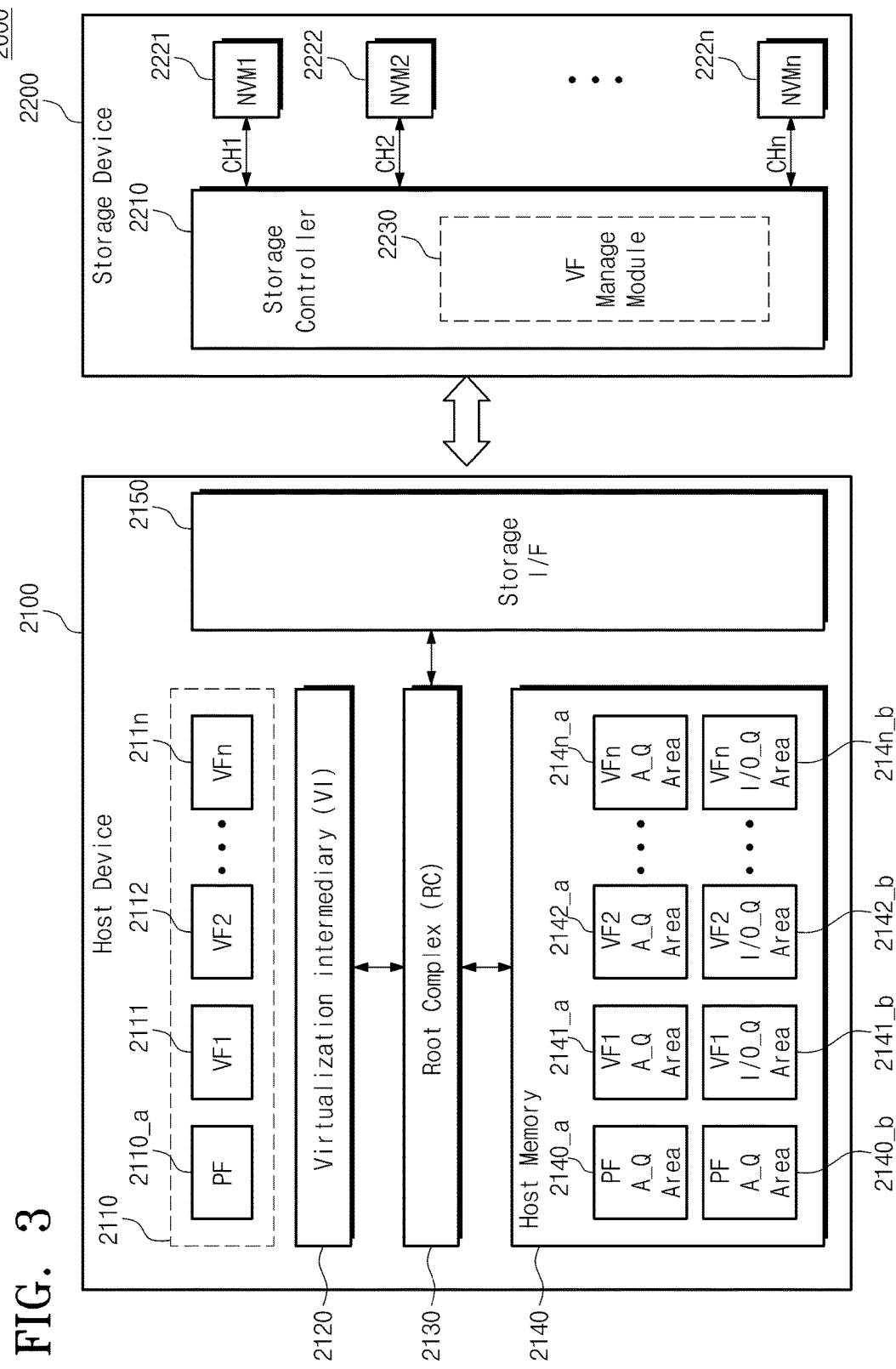
FIG. 3 is a block diagram illustrating an example of a memory system supporting a virtual function according to at least one example embodiment of the inventive concepts.

FIG. 3 is a block diagram illustrating an example of a memory system 2000 supporting a virtual function according to at least one example embodiment of the inventive concepts. A constitution of the memory system 2000 of FIG. 3 is partly similar to a constitution of the memory system 1000 of FIG. 2. Thus, the description of memory system 2000 below focuses primarily on differences with respect to the memory system 1000 of FIG. 2. Referring to FIG. 3, the memory system 2000 includes a host device 2100 and a storage device 2200.

The host device 2100 includes a host core 2110, a virtualization intermediary 2120, a root complex 2130, a host memory 2140, and a storage interface 2150. A constitution and operation of the host core 2110, the virtualization intermediary 2120, the root complex 2130, and the storage interface 2150 illustrated in FIG. 3 may be the same or, alternatively, similar to the constitution and operation described above with reference to the host core 1110, the virtualization intermediary 1120, the root complex 1130, and the storage interface 1150 illustrated in FIG. 2, and thus, a detailed description thereof is omitted. For example, the host core 2110 may be a processor or be implemented by a processor.

According to at least one example embodiment of the inventive concepts, either or both of the virtualization intermediary 2120 and root complex 2130 may include or be implemented by one or more circuits or circuitry (e.g., hardware) specifically structured to carry out some or all of the operations described herein as being performed by either or both of the virtualization intermediary 2120 and root complex 2130 (or an element thereof). According to at least one example embodiment of the inventive concepts, either or both of the virtualization intermediary 2120 and root complex 2130 may include or be implemented by a memory and one or more processors (e.g., host core 2110) executing computer-readable code (e.g., software) that is stored in the memory and includes instructions corresponding to some or all of the operations described herein as being performed by either or both of the virtualization intermediary 2120 and root complex 2130 (or an element thereof). According to at least one example embodiment of the inventive concepts, either or both of the virtualization intermediary 2120 and root complex 2130 may be implemented by, for example, a combination of the above-referenced hardware and processor executing software.

According to at least one example embodiment of the inventive concepts, an independent administrator queue is separately allocated to a plurality of VFs (virtualization functions) 2111~211n. That is, independent VF1 administrator queue~VFn administrator queue are allocated to the VFs 2111~211n respectively. Thus, each of the VFs 2111~211n can independently perform a queue management operation and a command/data transaction operation using a corresponding VF administrator queue.

For example, the VF1 administrator queue is allocated to a guest OS (operating system) of the VF1 2111. The VF1 2111 can independently perform a queue management operation and a command/data transaction operation using the VF1 administrator queue stored in a first virtual function administrator queue area VF1 A_Q Area 2141_a of the host memory 2140 and a plurality of virtual function input/output queues stored in a first virtual function input/output queue area VF1 I/O_Q Area 2141_b.

According to at least one example embodiment of the inventive concepts, when the virtualization intermediary 2120 does not need to intervene an overall virtual function and is involved in only a SR-IOV capability initialization through a physical function (PF) 2110_a, performance degradation of the memory system due to an overhead like FIG. 2 can be prevented.

To store virtualization function (VF) administrator queues 2141a~214n_a corresponding to the VFs 2111~211n, the host memory 2140 provides an area for storing a queue pair of the administrator queue and the input/output queues. That is, the host memory 2140 of FIG. 3 additionally provides the VF administrator queue storage areas (VF1 A_Q Area~VFn A_Q Area) 2141_a~214n_a while the host memory 1140 of FIG. 2 provides only the PF administrator queue storage area (PF A_Q Area) 1140_a, the PF input/output queue storage area (PF I/O_Q Area) 1140_b and the VF input/output queue storage areas (VF1 I/O_Q Area~VFn I/O_Q Area) 1141~114n. For example, each VF administrator queue and each VF input/output queue may be stored in the host memory 2140 in the form of circular queue.

The storage device 2200 includes a storage controller 2210 and a plurality of nonvolatile memories 2221~221n. Since an overall constitution and operation of the storage device 2200 are the same as or, alternatively, similar to that of the storage device 1200 of FIG. 2, a detailed description thereof is omitted.

According to at least one example embodiment of the inventive concepts, the storage controller 2210 may include or be implemented by one or more circuits or circuitry (e.g., hardware) specifically structured to carry out some or all of the operations described herein as being performed by the storage controller 2210 (or an element thereof). According to at least one example embodiment of the inventive concepts, the storage controller 2210 may include or be implemented by a memory and one or more processors executing computer-readable code (e.g., software) that is stored in the memory and includes instructions corresponding to some or all of the operations described herein as being performed by the storage controller 2210 (or an element thereof). According to at least one example embodiment of the inventive concepts, the storage controller 2210 may be implemented by, for example, a combination of the above-referenced hardware and processor executing software. The storage controller 2210 includes a VF management module 2230. The VF management module 2230 performs an operation of storing and processing VF administrator queues and VF input/output queues corresponding to the VFs 2111~211n respectively. A constitution and operation of the VF management module 2230 will be described in further detail in FIG. 4.

The memory system 2000 can support a virtual function while supporting a queue based command interface scheme. In the memory system 2000, each VF can independently perform an operation of a queue management and a command/data transaction by allocating an independent administration queue to each of the VFs (virtualization functions).

Figure 4:
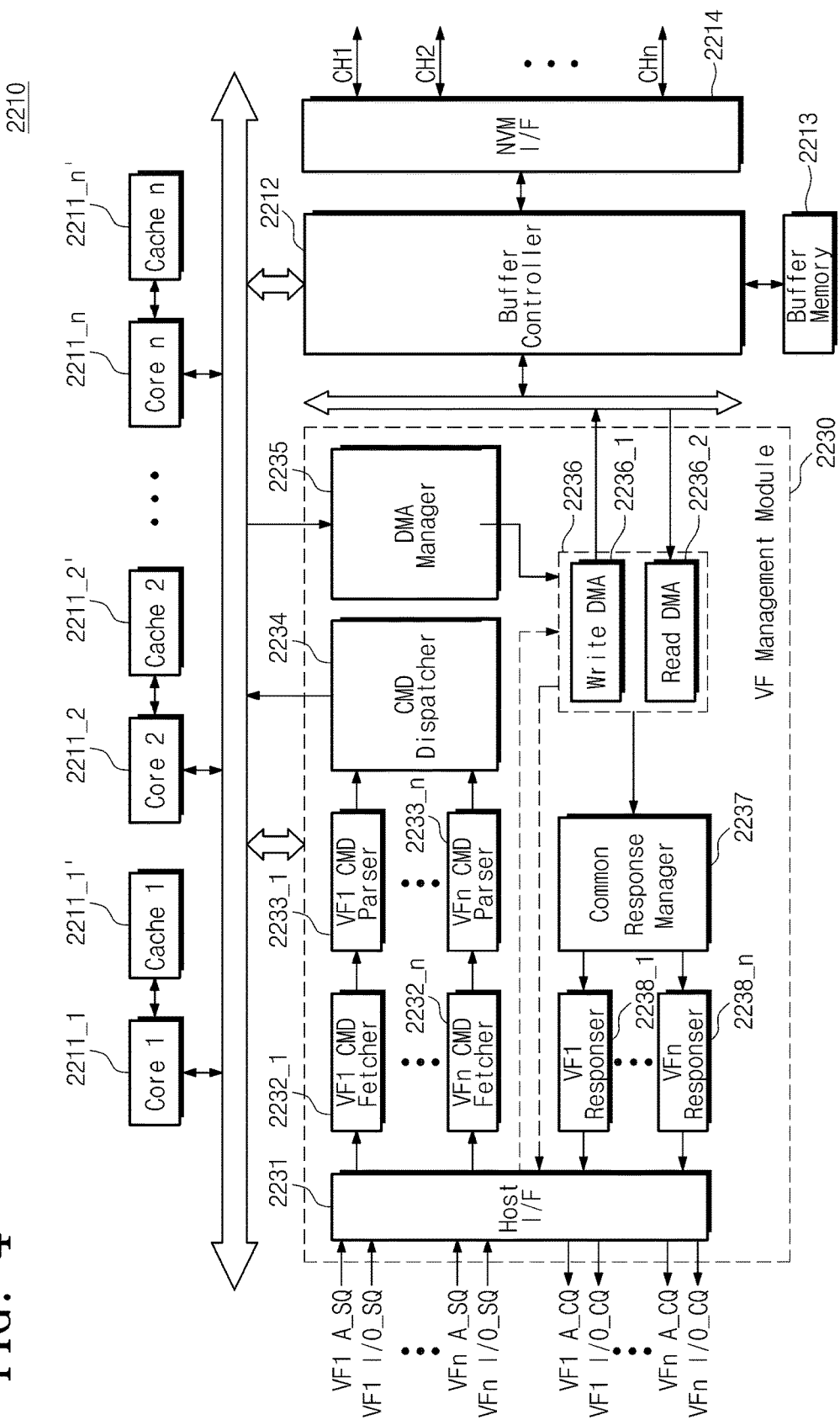
FIG. 4 is a block diagram illustrating a constitution and an operation of a storage controller and a virtualization management module of FIG. 3 in further detail.

FIG. 4 is a block diagram illustrating a constitution and an operation of the storage controller 2210 and a VF management module 2230 of FIG. 3 in further detail. Referring to FIG. 4, the storage controller 2210 includes a VF management module 2230, a plurality of cores 2211_1~2211_n, a plurality of caches 2211_1'~2211_n', a buffer controller 2212, a buffer memory 2213 and a nonvolatile memory interface 2214.

According to at least one example embodiment of the inventive concepts, the VF management module 2230 may be embodied to perform an operation of storing and processing a plurality of administration queues and a plurality of input/output queues corresponding to VFs received from the host device 2100 respectively. The VF management module 2230 includes a host interface 2231, a plurality of VF command fetchers 2232_1~2232_n, a plurality of VF command parsers 2233_1~2233_n, a command dispatcher 2234, a direct memory access (DMA) manager 2235, a DMA unit 2236, a common response manager 2237 and a plurality of virtualization responsers 2238_1~2238_n.

The host interface 2231 supports an interface operation between the host device 2100 (refer to FIG. 3) and the storage device 2200 (refer to FIG. 3). For example, as illustrated in FIG. 4, information of a VFn administrator submission queue VFn A_SQ and a VFn input/output submission queue VFn I/O_SQ that correspond to a VFn may be transmitted from the host device 2100 to the storage device 2200 through the host interface 2231. For example, the VFn administrator submission queue VFn A_SQ may include management information required by the VFn, and the VFn input/output submission queue VFn I/O_SQ may include information of read and write operations required by the VFn.

For example, information of a VFn administrator completion queue VFn A_CQ and a VFn input/output completion queue VFn I/O_CQ that correspond to a VFn may be provided from the storage device 2200 to the host device 2100 through the host interface 2231. For example, the VFn administrator completion queue VFn A_CQ may include response information corresponding to a processing result of the VFn administrator submission queue VFn A_SQ and the VFn input/output completion queue VFn I/O_CQ may include response information corresponding to a processing result of the VFn input/output submission queue VFn I/O_SQ.

The first through nth VF command fetchers 2232_1~2232_n correspond to information of the first through nth VF submission queues respectively and support an operation of fetching a command stored in the corresponding submission queue. For example, the VF1 command fetcher 2232_1 corresponds to information of the first VF administrator submission queue VF1 A_SQ and the first VF input/output submission queue VF1 I/O_SQ and performs an operation of fetching the information of the first VF administrator submission queue VF1 A_SQ and the first VF input/output submission queue VF1 I/O_SQ in respond to a ring doorbell signal.

In describing the fetching operation in further detail, if the submission queue information is input to the first VF administrator queue storage area (VF1 A_Q Area) 2141_a of the host memory 2140 (refer to FIG. 3), the host device 2100 transmits a ring doorbell signal to the controller 2210. For example, the VF1 command fetcher 2232_1 accesses first VF administrator queue storage area (VF1 A_Q Area) 2141_a in response to the corresponding ring doorbell signal and temporarily stores command information of the first VF administrator submission queue VF1 A_SQ in a memory inside the Wt command fetcher 2232_1.

In the case that submission queue information is input to the first VF input/output queue storage area (VF1 I/O_Q Area) 2141_b of the host memory 2140 (refer to FIG. 3), the host device 2100 transmits a ring doorbell signal to the controller 2210. After that, the VF1 command fetcher 2232_1 accesses first VF input/output queue storage area (VF1 I/O_Q Area) 2141_b in response to the corresponding ring doorbell signal and temporarily stores command information of the first VF input/output submission queue VF1 I/O_SQ in a memory inside the VF1 command fetcher 2232_1.

The first through nth VF command parsers 2233_1~2233_n are connected to the first through nth VF command fetchers 2232_1~2232_n respectively. The first through nth VF command parsers 2233_1~2233_n receive a command with respect to an administration submission queue or an input/output submission queue from the first through nth VF command fetchers 2232_1~2232n respectively and can perform an operation of parsing a characteristic of each command. For example, the first VF command parser 2233_1 can perform an operation of receiving a command from the first VF command fetcher 2232_1 and parsing a characteristic of the received command and an operation content required by the command.

The command dispatcher 2234 is connected to the first through nth VF command parsers 2233_1~2233_n in common. The command dispatcher 2234 performs an operation of receiving a plurality of parsed commands from the first through nth VF command parsers 2233_1~2233_n and properly distributing the parsed commands to the cores 2211_1~2211_n according to characteristics of the commands. For example, the command dispatcher 2234 can distribute the commands so that the cores 2211_1~2211_$n$ operate in parallel.

The cores 2211_1~2211_$n$ are connected to the command dispatcher 2234 through a bus and receive commands from the command dispatcher 2234. The cores 2211_1~2211_$n$ are connected to the cache memories 2211_1'~2211_$n$' respectively and perform an operation of adjusting commands with reference to an instruction stored in a corresponding cache memory. For example, in the case that a size of the received command and data corresponding to the received command exceed a total amount of data that the data DMA unit 2236 is capable of processing at a time (i.e., a data capacity of the data DMA unit 2236), a corresponding core performs an operation of properly adjusting so that the corresponding core is processed in the DMA unit 2236 with reference to an instruction stored in a corresponding cache memory.

The DMA manager 2235 receives adjusted commands from the cores 2211_1~2211_$n$ through the bus and controls the DMA unit 2236 according to the received commands.

The DMA unit 2236 includes a write DMA 2236_1 and a read DMA 2236_2 and controls a data write operation or a data read operation under the control of the DMA manager 2235. For example, in the case of performing a write operation under the control of the DMA manager 2235, the write DMA 2236_1 receives data through the host interface 2231 and controls the storage device 2200 so that the received data is stored in any one of the nonvolatile memories 2221~222$n$. In the case of performing a read operation under the control of the DMA manager 2235, the read DMA 2236_2 performs a read operation with respect to any one of the nonvolatile memories 2221~222$n$ under the control of the DMA manager 2235 and provides the read data to the host device 2100 through the host interface 2231.

The common response manager 2237 is connected to the DMA unit 2236 and receives response information with respect to each command. For example, in the case that the first through nth virtual function input/output submission queues VF1 I/O SQ~VFn. I/O SQ are related to write commands with respect to the first through nth data respectively, the common response manager 2237 can receive information (for example, write fail information) about write results with respect to the first through nth data from the DMA unit 2236.

For example, response information about a processing result of the first virtual function administrator submission queue VF1 A_SQ may correspond to the first virtual function administrator completion queue VF1 A_CQ and response information about a processing result of the first virtual function input/output submission queue VF1 I/O_SQ may correspond to the first virtual function input/output completion queue VF1 I/O_CQ. Similarly, response information about a processing result of the nth virtual function administrator submission queue VFn A_SQ may correspond to the nth virtual function administrator completion queue VFn A_CQ and response information about a processing result of the nth virtual function input/output submission queue VFn I/O_SQ may correspond to the nth virtual function input/output completion queue VFn I/O_CQ.

The common response manager 2237 performs a function of distributing collected response information to the first through nth virtual function responsers 2238_1~2238_$n$. For example, the common response manager 2237 distributes information of the first virtual function administrator completion queue VF1 A_CQ and the first virtual function input/output completion queue VF1 I/O_CQ to the first virtual function responser 2238_1 and distributes information of the nth virtual function administrator completion queue VFn A_CQ and the nth virtual function input/output completion queue VFn I/O_CQ to the nth virtual function responser 2238_$n$.

The first through nth virtual function responsers 2238_1~2238_$n$ are connected to the common response manager 2237 in common and receive information of corresponding virtual function administrator completion queue VF A_CQ and corresponding virtual function input/output completion queue VF I/O_CQ. The first through nth virtual function responsers 2238_1~2238_$n$ record the received information of the completion queues in the host memory 2140.

For example, the first virtual function responser 2238_1 can record information of the first virtual function administrator completion queue VF1 A_CQ and information of the first virtual function input/output completion queue VF1 I/O_CQ in the first virtual function administrator queue storage area 2141_$a$ and the first virtual function input/output queue storage area 2141_$b$ of the host memory 2140 respectively. For another example, the nth virtual function responser 2238_$n$ can record information of the nth virtual function administrator completion queue VFn A_CQ and information of the nth virtual function input/output completion queue VFn I/O_CQ in the nth virtual function administrator queue storage area 214$n$_$a$ and the nth virtual function input/output queue storage area 214$n$_$b$ of the host memory 2140 respectively.

After the first through nth virtual function responsers 2238_1~2238_$n$ complete record operations with respect to the completion queues respectively, they can generate an interrupt signal and notify the host device 2100 of the interrupt signal. For example, in response to the interrupt signal, the host device 2100 can check information about a processing result of the host memory 2140 and process the information.

The buffer controller 2212 is connected to the VF management module 2230 and the buffer memory 2231. The buffer controller 2212 performs an operation of controlling the buffer memory to perform a read operation or a write operation in response to a control of the DMA unit 2236.

The buffer memory 2213, in a read or write operation, performs a function of a buffer in which read data or write data is temporarily stored. For example, the buffer memory 2213 may be embodied by a DRAM. However, this is illustrative and the buffer memory 2213 may be embodied by a volatile memory such as a SRAM, a SDRAM, etc. or combinations thereof.

The nonvolatile memory interface 2214 is connected to the nonvolatile memories 2221~221$n$ through a plurality of channels CH1~CHn and provides an interface between the storage controller 2210 and the nonvolatile memories 2221~221$n$.

As described above, the VF management module 2230 can support a function of storing and processing an administrator queue and input/output queues corresponding to VFs (virtualization function) respectively so that the VFs 2111~211$n$ of the host device 2100 are independently driven. The VF management module 2230 may be configured to perform independent fetching, parsing and response operations on every VF (virtualization function) so that an operation required by the each VF is processed in the storage device 2200 in parallel. In addition, the storage device 2200 may further include the cores 2211_1~2211$n$ to more effectively support a parallel processing with respect to the operation required by the each VF.

The storage device 2200 can support a virtual function while supporting the queue based command interface scheme and can also more rapidly process a requirement of a host.

The aforementioned description is only illustrative and a technical spirit of at least some example embodiments of the inventive concepts is not limited thereto. For example, in FIGS. 3 and 4, it was described that the memory system 2000 supports a virtual function of SR-IOV scheme. However, this is only illustrative and the memory system 2000 may also be applied to a MR-IOV scheme. FIGS. 3 and 4 were described with reference to an example in which the memory system 2000 supports an interface scheme according to an NVMe protocol scheme. However, this is only illustrative and the memory system 2000 may also be applied to a scheme (for example, PQI, PQI/NVMe scheme) based on a PCIe interface. In FIGS. 3 and 4, it was described that an independent VF management queue is allocated to all the VFs. However, this is only illustrative and an independent VF management queue may be allocated to at least one VF.

Figure 5:
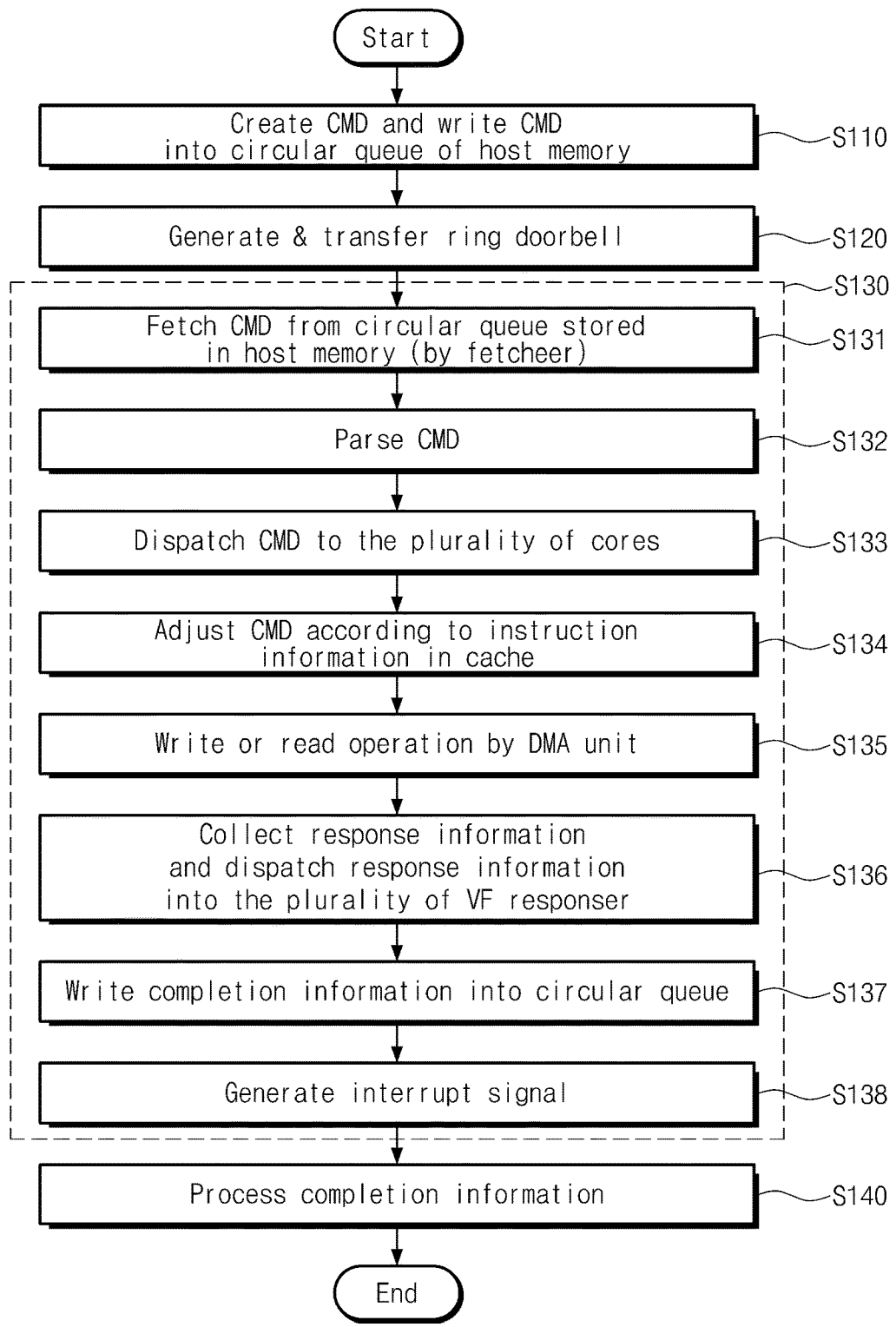
FIG. 5 is a flow chart illustrating operations of a host device and a storage device of FIG. 3.

FIG. 5 is a flow chart illustrating operations of the host device 2100 and the storage device 2200 of FIG. 3. Operations of the host device 2100 and the storage device 2200 will be described in further detail below with reference to FIGS. 3, 4 and 5.

In a step S110, a command CMD is generated by the PF (physical function) 2110_a or the VFs 2111~211n. The command CMD generated by the PF (physical function) 2110_a may be stored in the PF administrator queue storage area 2140_a or the PF input/output queue storage area 2140_b of the host memory 2140. The command generated by the VFs 2111~211n may be stored in corresponding VF administrator queue storage area 2141_a~214n_a or corresponding VF input/output queue storage area 2141_b~214n_b. For example, each command may be stored in the manner of being input to a submission queue of a circular queue form.

In a step S120, the host device 2100 generates a ring doorbell signal and transmits the generated ring doorbell signal to the storage device 2200. After that, in a step S130, the storage device 2200 performs an operation for processing the command stored in the host memory 2140.

In a step S131, the first through nth VF command fetchers 2232_1~2232_n fetch command information stored in a circular queue of the host memory 2140 in response to the ring doorbell signal. For example, the first VF command fetcher 2232_1 fetches command information stored in a submission queue of the first VF administrator queue storage area 2141_a or the first VF input/output queue storage area 2141_b in response to the ring doorbell.

In a step S132, the first through nth VF command parsers 2233_1~2233_n perform a parsing operation of analyzing a characteristic of commands stored in corresponding first through nth VF command fetchers 2232_1~2232_n. After that, the parsed commands are all transmitted to the command dispatcher 2234.

In a step S133, the command dispatcher 2234 receives the parsed commands from the first through nth VF command parsers 2233_1~2233_n and properly distributes corresponding parsed commands to the cores 2211_1~2211_n. For example, the command dispatcher 2234 distributes the parsed commands so that the cores 2211_1~2211_n operate in parallel.

In a step S134, the cores 2211_1~2211_n perform an operation of properly adjusting the commands so that the DMA unit 2236 can process the received commands. For example, the cores 2211_1~2211_n can perform the adjusting operation with reference to instructions stored in corresponding cache memories 2211_1'~2211_n'.

In a step S135, a write or read operation is performed by the DMA unit 2236. For example, in the case that a write operation is performed, the write DMA 2236_1 of the DMA unit 2236 performs an operation of writing data in the nonvolatile memories 2221~222n under the control of the DMA manager 2235. For example, in the case that a read operation is performed, the read DMA 2236_2 of the DMA unit 2236 performs an operation of reading data stored in the nonvolatile memories 2221~222n under the control of the DMA manager 2235.

In a step S136, the common response manager 2237 receives response information with respect to a processing result of each command. For example, in the case that an operation requested by the VFs 2111~211n of the host device 2100 is a read operation, the common response manager 2237 may receive response information about whether a corresponding write or read operation succeeds or not. After that, the common response manager 2237 distributes the received response information to corresponding first through nth VF responsers 2238_1~2238_n respectively.

In a step S137, the first through nth VF responsers 2238_1~2238n can receive corresponding response information and store the received response information in the host memory 2140. For example, a processing result with respect to a command generated by the PF 2110_a may be stored in the PF administrator queue storage area 2140_a or the PF input/output queue storage area 2140_b of the host memory 2140. A processing result with respect to a command generated by the VFs 2111~211n may be stored in corresponding VF administrator queue storage area 2141_a~214n_a or corresponding VF input/output queue storage area 2141_a~214n_b. For example, each command may be stored in the manner of being input to a completion queue of a circular queue form.

In a step S138, after an operation of writing response information in a completion queue, the storage device 2200 generates an interrupt signal.

After that, in a step S140, the host device 2100 performs an operation of processing corresponding response information based on the response information written in the completion queue.

The aforementioned description is illustrative and a technical spirit of at least some example embodiments of the inventive concepts is not limited thereto. Various application examples in accordance with the technical spirit of at least some example embodiments of the inventive concepts will be described below in further detail.

Figure 6:
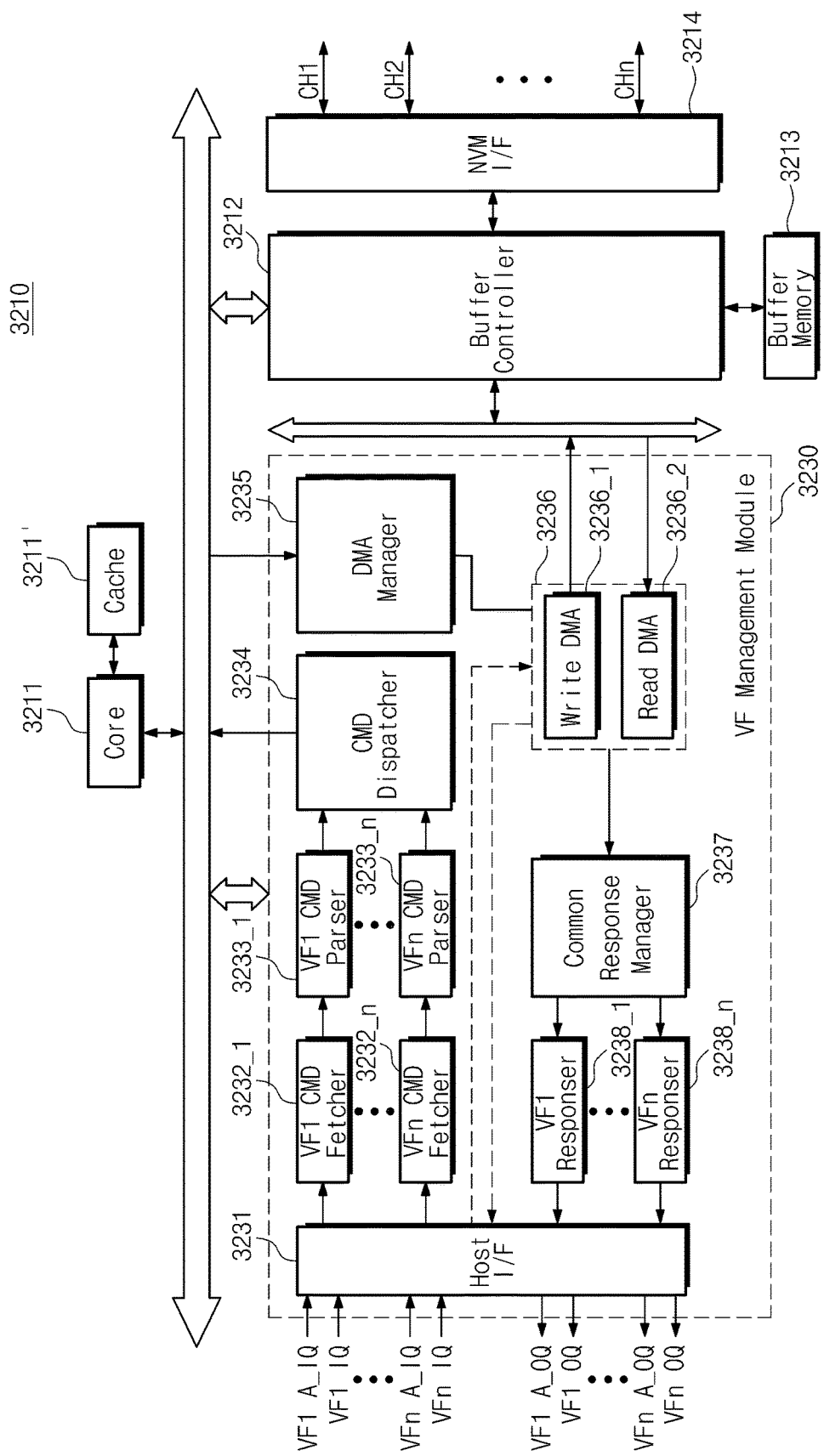
FIG. 6 is a block diagram illustrating a storage device according to at least one example embodiment of the inventive concepts.

FIG. 6 is a block diagram illustrating a storage device 3210 according to at least one example embodiment of the inventive concepts. The storage device 3210 of FIG. 6 is similar to the storage device 2210 of FIG. 4. Thus, similar elements will be described using similar reference numerals. For brevity of description, the discussion of FIG. 6 focuses, primarily, on differences between the storage device 3210 of FIG. 6 and the storage device 2210 of FIG. 4. Referring to FIG. 6, the storage device 3210 may include a core 3211, a cache memory 3211', a VF (virtualization function) management module 3230, a buffer controller 3212, a buffer memory 3213 and a nonvolatile memory interface 3214.

Unlike the storage device 2210 of FIG. 4, the storage device 3210 of FIG. 6 includes only one single core 3211. That is, the storage device 3210 of FIG. 6 includes only one single core 3211 while the storage device 2210 of FIG. 4 includes multi cores 2211_1~2211_n. Thus, the storage device 3210 of FIG. 6 can be embodied in a small area.

Figure 7:
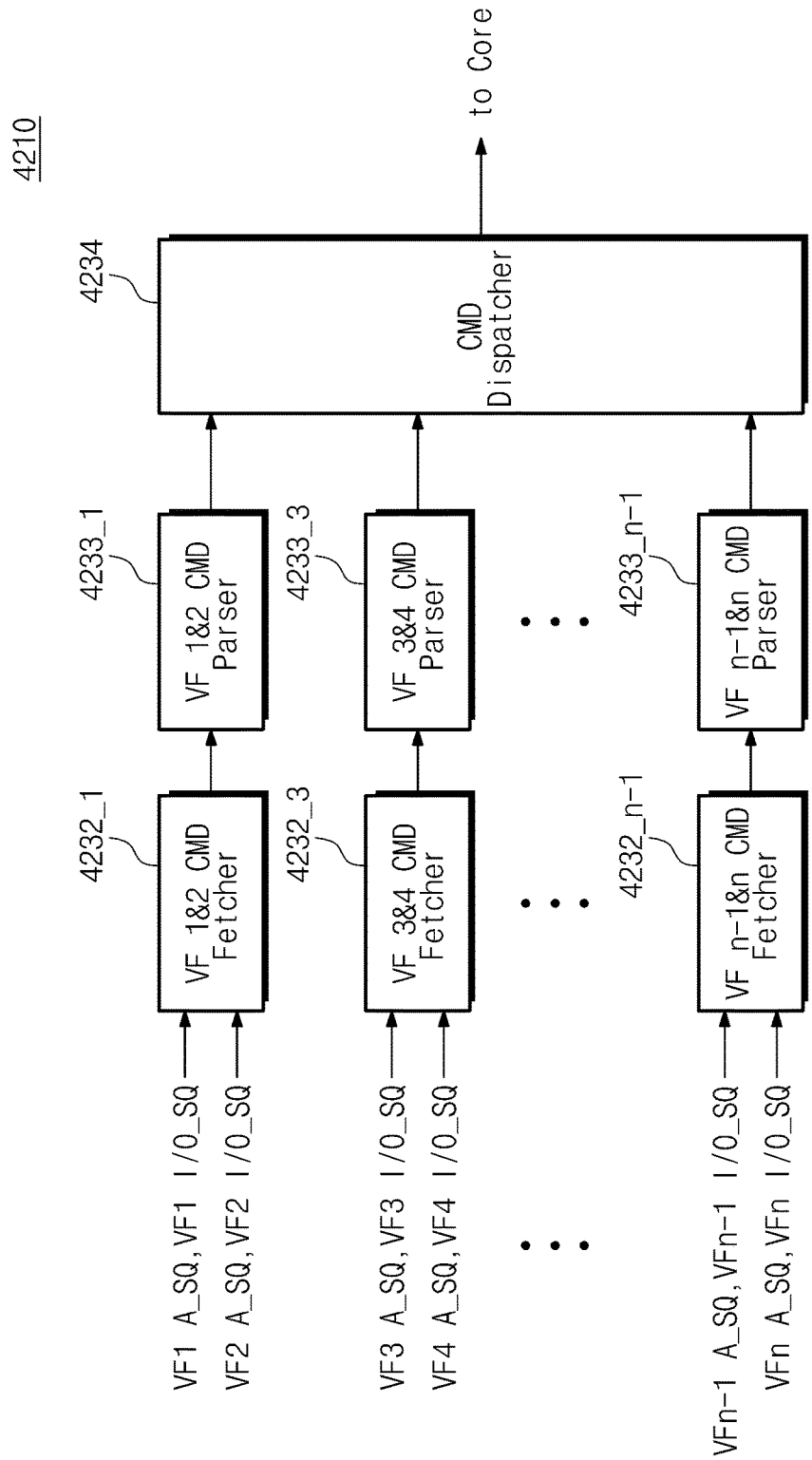
FIGS. 7 and 8 are block diagrams illustrating a configuration of a storage device according to at least one example embodiment of the inventive concepts.
Figure 8:
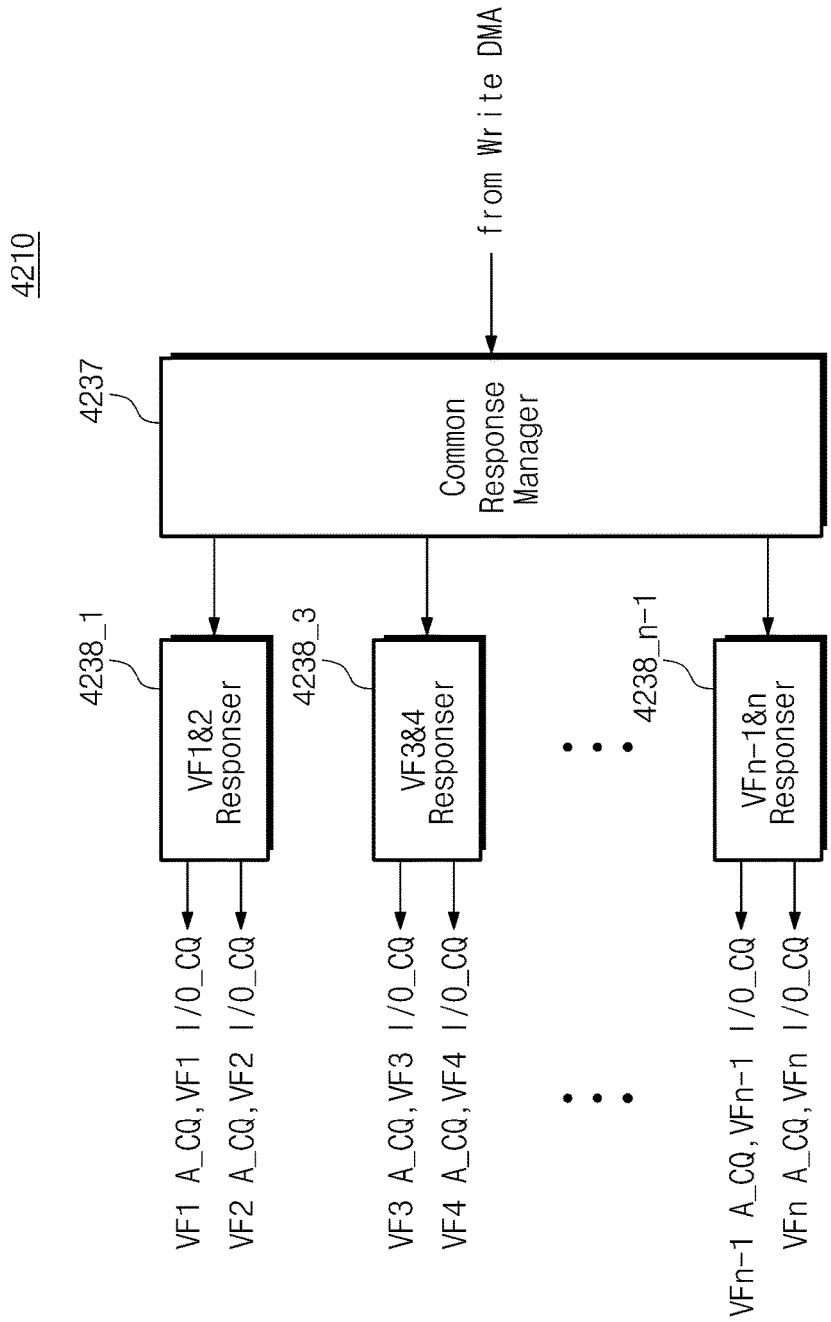

FIGS. 7 and 8 are block diagrams illustrating a configuration of a storage device 4210 according to at least one example embodiment of the inventive concepts. The storage device 4210 of FIGS. 7 and 8 is similar to the storage device 2210 of FIG. 4. Thus, similar elements will be described using similar reference numerals. For accuracy and brevity of description, a discussion of elements of the storage device 4210 performing a function and/or operation identical or similar to elements of the storage device 2210 of FIG. 4 is omitted. The discussion of FIGS. 7 and 8 focuses, primarily, on differences between the storage device 4210 of FIGS. 7 and 8 and the storage device 2210 of FIG. 4. Referring to FIG. 7, the storage device 4210 includes a plurality of VF fetchers 4232_1~4232_n-1, a plurality of VF command parsers 4233_1~4233_n-1 and a command dispatcher 4234.

Unlike the storage device 2210 of FIG. 4, in the storage device 4210 of FIG. 7 queues corresponding to two VFs share one VF command fetcher and one VF command parser. For example, as illustrated in FIG. 7, queues VF1 A_SQ and VF1 I/O_SQ related to the first VF and queues VF2 A_SQ and VF2 I/O_SQ related to the second VF share one VF command fetcher 4232_1 and one VF command parser 4233_1. Thus, the storage device 4210 of FIG. 7 can be embodied in a smaller area.

Referring to FIG. 8, the storage device 4210 includes a common response manager 4237 and a plurality of VF responsers 4238_1~4238_n-1.

Unlike the storage device 2210 of FIG. 4, in the storage device 4210 of FIG. 8, response information corresponding to two VFs shares one VF responser. For example, as illustrated in FIG. 8, response information VF1 A_CQ and VF1 I/O_CQ related to the first VF and response information VF2 A_CQ and VF2 I/O_CQ related to the second VF share one VF responser 4238_1. Thus, the storage device 4210 of FIG. 8 can be embodied in a small area.

The aforementioned description is only illustrative and a technical spirit of at least some example embodiments of the inventive concepts is not limited thereto. For example, queues with respect to three or more VFs can share one VF command fetcher and on VF command parser.

Figure 9:
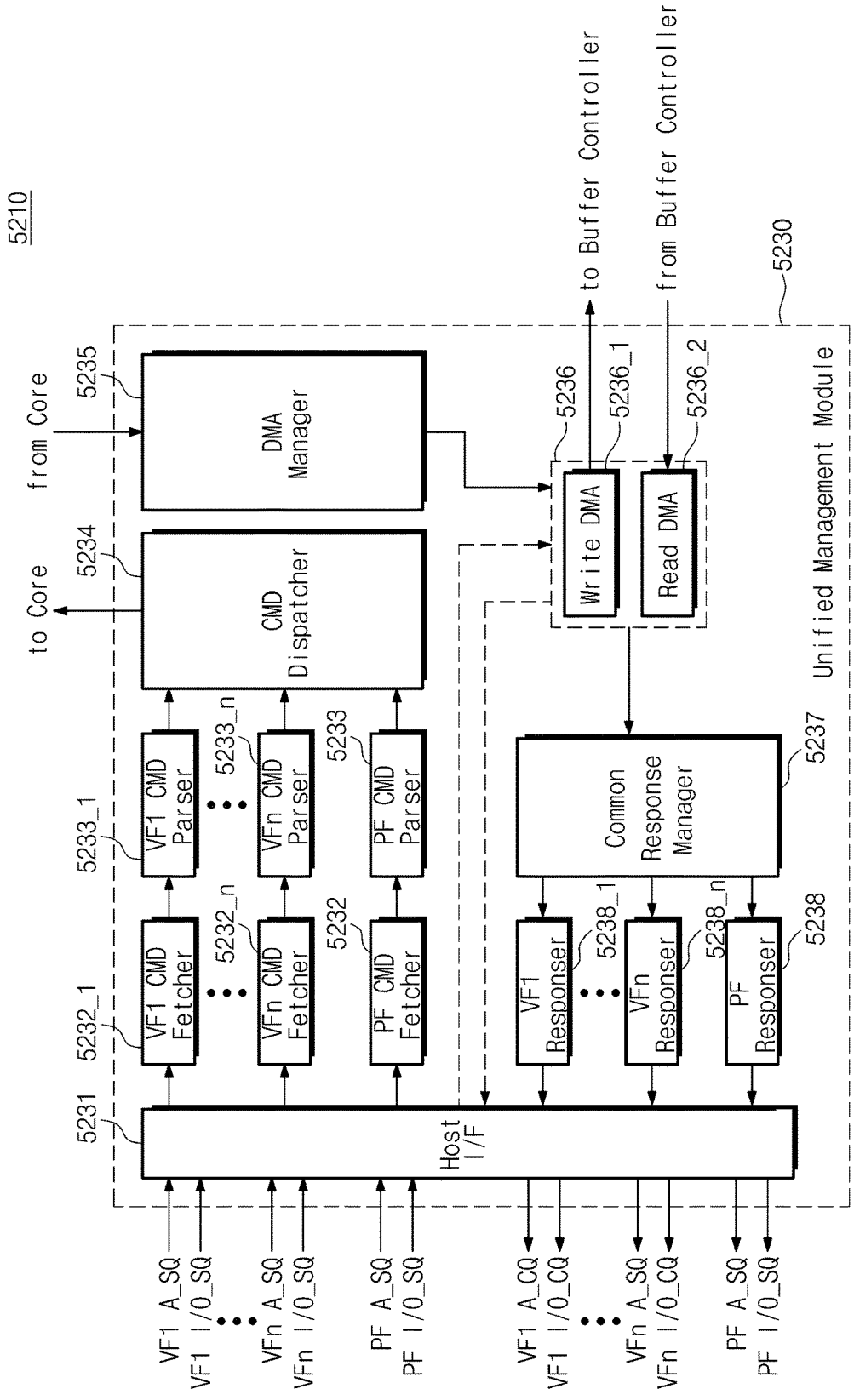
FIG. 9 is a block diagram illustrating a storage device according to at least one example embodiment of the inventive concepts.

FIG. 9 is a block diagram illustrating a storage device 5210 according to at least one example embodiment of the inventive concepts. The storage device 5210 of FIG. 9 is similar to the storage device 2210 of FIG. 4. Thus, similar elements will be described using similar reference numerals. For accuracy and brevity of description, a discussion of elements of the storage device 5210 performing a function and/or operation identical or similar to elements of the storage device 2210 of FIG. 4 is omitted. The discussion of FIG. 9 focuses, primarily, on differences between the storage device 5210 of FIG. 9 and the storage device 2210 of FIG. 4.

Referring to FIG. 9, the storage device 5210 includes a unified management module 5230. The unified management module 5230 includes a host interface 5231, a plurality of VF command fetchers 5232_1~5232_n, a PF command fetcher 5232, a plurality of VF command parsers 5233_1~5233_n, a PF command parser 5233, a command dispatcher 5234, a DMA manager 5235, a DMA unit 5236, a common response manager 5237, a plurality of VF responsers 5238_1~5238_n, and a PF responser 5238.

Unlike the VF management module 2230 of FIG. 4, the unified management module 5230 of FIG. 9 further includes elements providing the capability of processing queues with respect to the PF 2110_a (refer to FIG. 3). That is, the unified management module 5230 of FIG. 9 includes not only elements providing the capability of storing and processing queues with respect to the VFs 2111~211n (refer to FIG. 3) but also elements providing the capability of storing and processing queues with respect to the PFs 2110_a.

More specifically, the unified management module 5230 further includes the PF command fetcher 5232 and the PF command parser 5233 compared with the VF management module 2230 of FIG. 4. A PF administrator submission queue PF A_SQ and a PF input/output submission queue PF I/O_SQ that are fetched through the PF command fetcher 5232 are processed together with queues with respect to VFs.

The unified management module 5230 of FIG. 9 further includes the PF responser 5238 compared with the VF management module 2230 of FIG. 4 and response information with respect to an operation requested by the PF 2110_a is processed together with response information with respect to other VFs.

Figure 10:
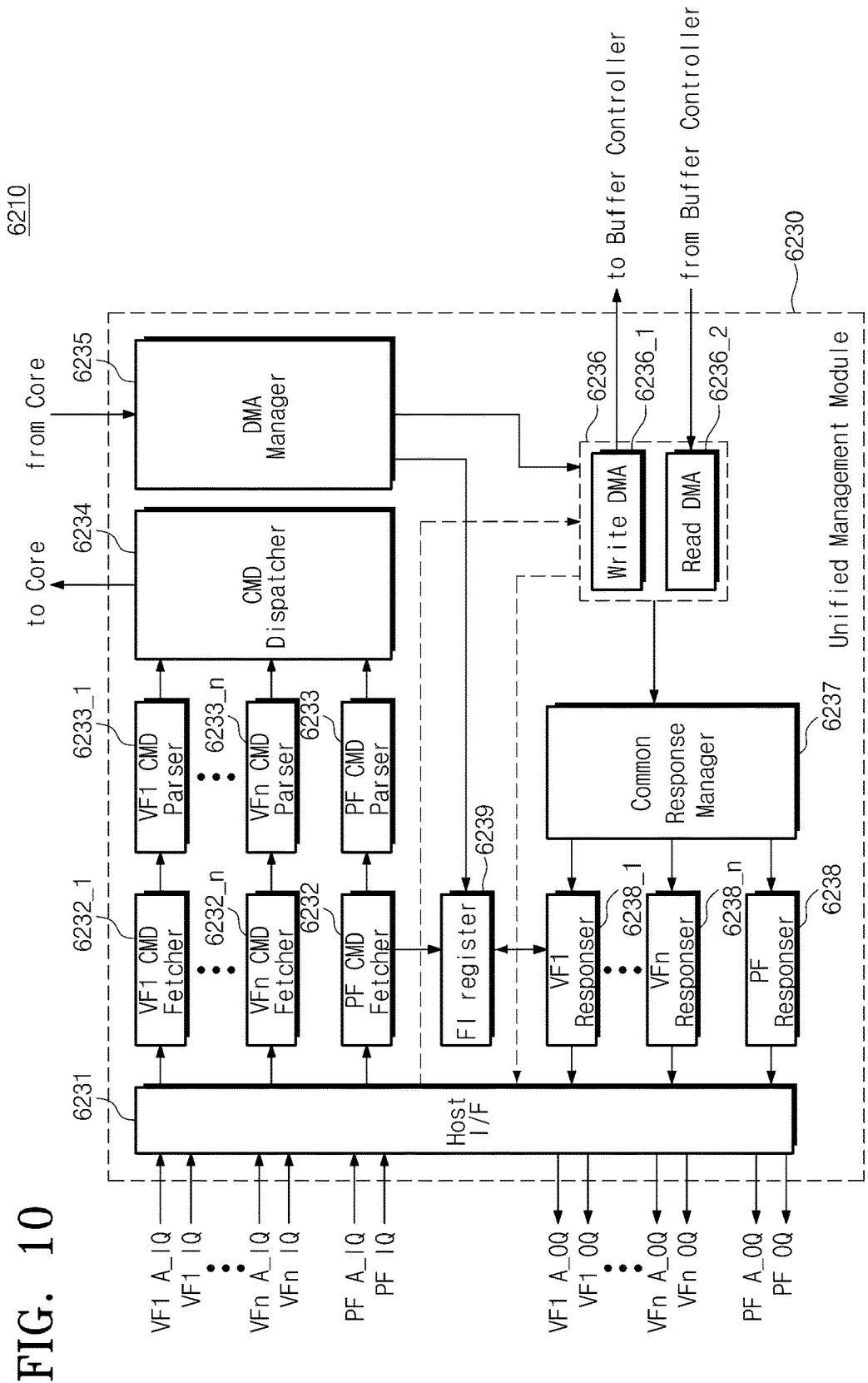
FIG. 10 is a block diagram illustrating a storage device according to at least one example embodiment of the inventive concepts.

FIG. 10 is a block diagram illustrating a storage device 6210 according to at least one example embodiment of the inventive concepts. The storage device 6210 is similar to the storage device 5210 of FIG. 9. Thus, similar elements will be described using similar reference numerals.

Referring to FIG. 10, the storage device 6210 includes a unified management module 6230. The unified management module 6230 includes a host interface 6231, a plurality of VF command fetchers 6232_1~6232_n, a PF command fetcher 6232, a plurality of VF command parsers 65233_1~6233_n, a PF command parser 6233, a command dispatcher 6234, a DMA manager 6235, a DMA unit 6236, a common response manager 6237, a plurality of VF responsers 6238_1~6238_n, a PF responser 6238 and a fetch information register 6239.

Unlike the unified management module 5230 of FIG. 9, the unified management module 6230 of FIG. 10 further includes the fetch information register 6239 storing address information for performing a fetching operation. For example, the VF command fetchers 6232_1~6232_n and the PF command fetcher 6232 can perform a fetching operation with reference to address information stored in the fetch information register 6239.

More specifically, in order for the VF command fetchers 6232_1~6232_n and the PF command fetcher 6232 to access the host memory 2140 to perform a fetching operation, they have to refer to address information about corresponding storage area inside the host memory 2140. For example, in order for the first VF command fetcher 6232_1 to access the first VF command queue storage area 2141_a to perform a fetching operation, the first VF command fetcher 6232_1 has to refer address information about corresponding first VF command queue storage area 2141_a.

Unlike the storage device 2210 of FIG. 4 storing the address information in a memory inside the VF command fetcher, the storage device 6210 of FIG. 10 may be embodied to separately include the fetch information register 6239.

Figure 11:
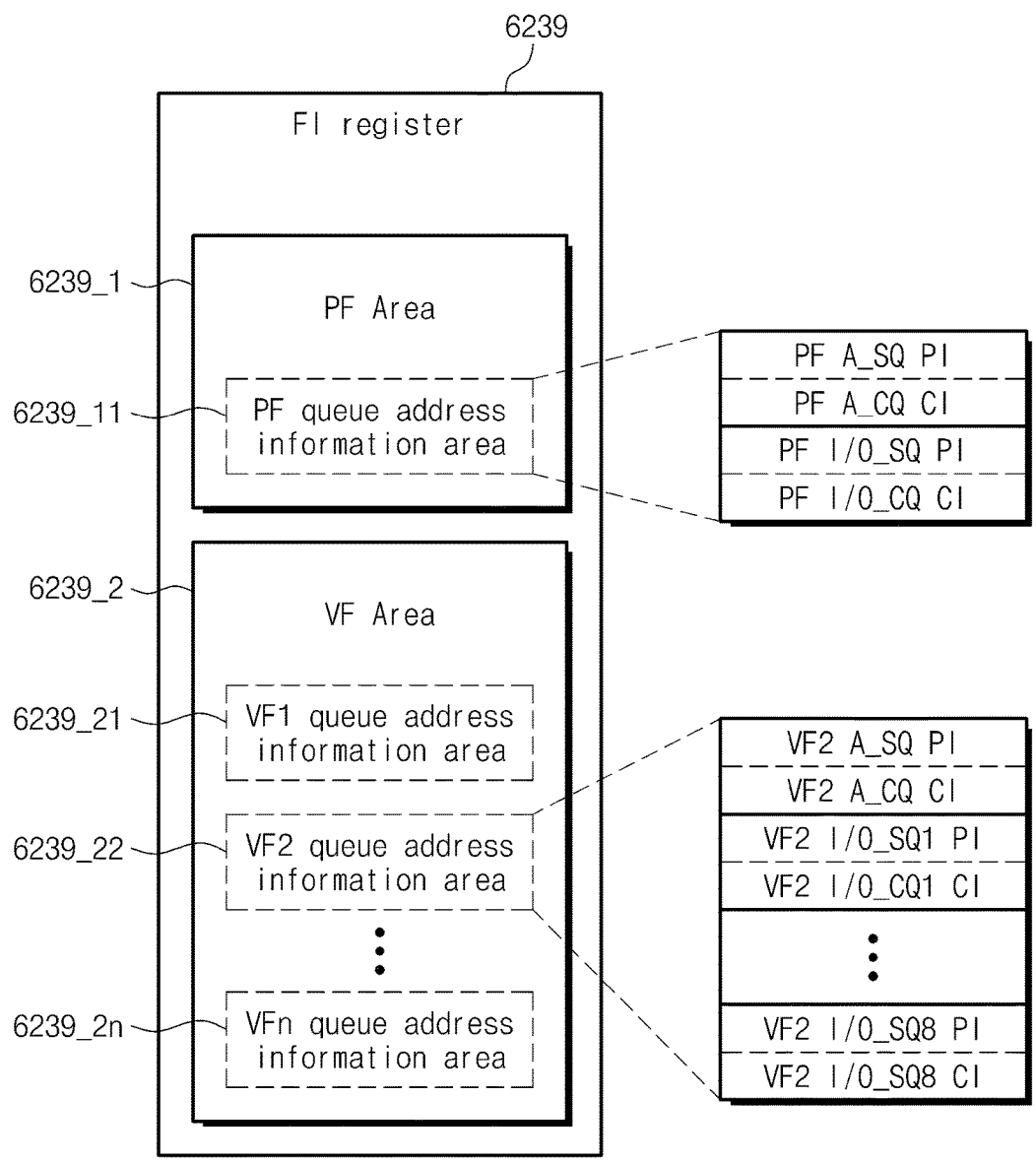
FIG. 11 is a drawing illustrating a data structure of a fetch information register of FIG. 10.

FIG. 11 is a drawing illustrating a data structure of the fetch information register 6239 of FIG. 10. Referring to FIG. 11, the fetch information register 6239 includes a PF (physical function) area 6239_1 and a VF (virtualization function) area 6239_2.

The PF (physical function) area 6239_1 includes a PF queue address information area 6239_11. Address information needed in order for the PF command fetcher 6232 (refer to FIG. 10) to access a desired or, alternatively, predetermined area of the host memory 2140 is stored in the PF queue address information area 6239_11. The desired or, alternatively, predetermined area may be selected, for example, by a user or, alternatively, a manufacturer. For example, as illustrated in FIG. 11, address information PF A_SQ PI and PF A_CQ CI associated with an administrator queue of PF and address information PF I/O_SQ PI and PF I/O_CQ CI associated with an input/output queue of PF.

In the case that a command generated by the PF 2110_a is stored in a submission queue of the PF administrator queue storage area 2140_a of the host memory 2140, the host device 2100 generates doorbell signaling and transmits the generated doorbell to the storage device 2200. For example, information needed for the fetcher 6232 corresponding to the PF 2110_a to access a corresponding command is included in the doorbell signaling. Specifically, the doorbell signal includes information of a PF administrator submission queue producer index PF A_SQ PI and a PF administrator completion queue consumer index PF A_CQ CI. The information included in corresponding doorbell signaling is stored in the fetch information register 6239. Thus, after that, the PF command fetcher 6232 can access a corresponding area inside the host memory 2140 on the basis of address information stored in the fetch information register 6239.

Similarly, in the case that a command generated by the PF 2110_a is stored in a submission queue of the PF input/output queue storage area 2140_b of the host memory 2140, the doorbell signaling includes information of a PF input/output submission queue producer index PF I/O_SQ PI and a PF input/output completion queue consumer index PF I/O_CQ CI. The information included in corresponding doorbell signaling is stored in the fetch information register 6239. Thus, after that, the PF command fetcher 6232 can access a corresponding area inside the host memory 2140 on the basis of address information stored in the fetch information register 6239.

Similarly, in the case that commands generated by the VFs 2111~211n are stored in submission queues of the VF administrator queue storage areas 2141_a~214n_a respectively, the doorbell signaling includes information of a VF administrator submission queue producer index VF A_SQ PI and a VF administrator completion queue consumer index VF A_CQ CI. The information included in corresponding doorbell signaling is stored in the fetch information register 6239.

Similarly, in the case that commands generated by the VFs 2111~211n are stored in submission queues of the VF input/output queue storage areas 2141_b~214n_b respectively, the doorbell signaling includes information of a VF input/output submission queue producer index VF I/O_SQ PI and a VF input/output completion queue consumer index VF I/O_CQ CI. The information included in corresponding doorbell signaling is stored in the fetch information register 6239.

Thus, after that, the VF command fetchers 6232_1~6231_n can access corresponding areas inside the host memory 2140 on the basis of address information stored in the fetch information register 6239 respectively.

Figure 12:
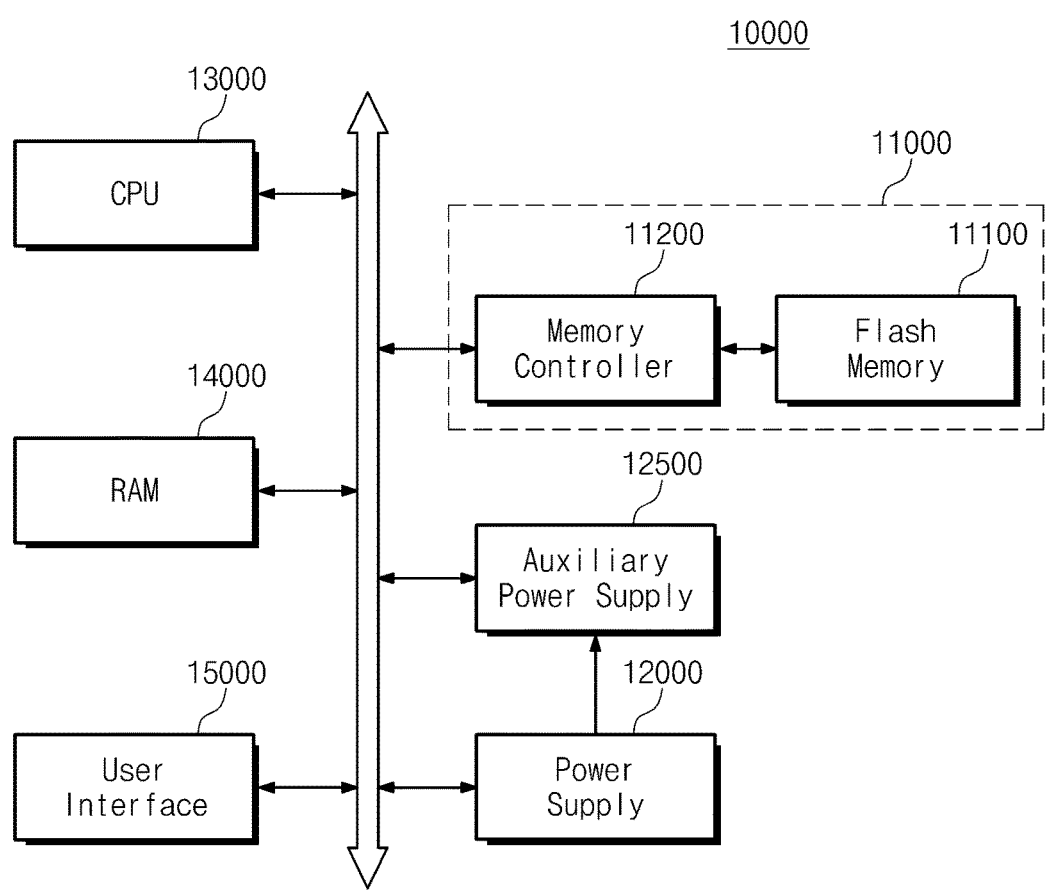
FIG. 12 is a block diagram illustrating an example of applying a memory system in accordance with at least one example embodiment of the inventive concepts.

FIG. 12 is a block diagram illustrating an example of applying a memory system in accordance with at least one example embodiment of the inventive concepts. The memory system 11000 may be connected to a server, a personal computer PC, a notebook computer, a cellular phone, a PDA (personal digital assistant), and a camera to be used. For convenience of description, it is assumed that a flash memory module 11100 is used as a storage device of the server 10000. The server 10000 may be called an enterprise device.

Referring to FIG. 12, the server 10000 includes a memory system 11000, a power supply 12000, an auxiliary power supply 12500, a CPU (central processing unit) 13000, a RAM 14000, and a user interface 15000. The memory system 11000 includes the flash memory 11100 and a memory controller 11200. In FIG. 12, the memory system 11000 includes one flash memory 11100 but at least some example embodiments of the inventive concepts are not limited thereto. For example, the memory system 11000 may include a plurality of flash memories, a flash memory and other nonvolatile memories, or combinations thereof. The memory system 11000 may be embodied in the form that the memory controller 11200 and the flash memory 11100 are integrated in one package. As described above, the memory system 11000 illustrated in FIG. 12 can support the queue based interface scheme and a virtual function at the same time.

Figure 13:
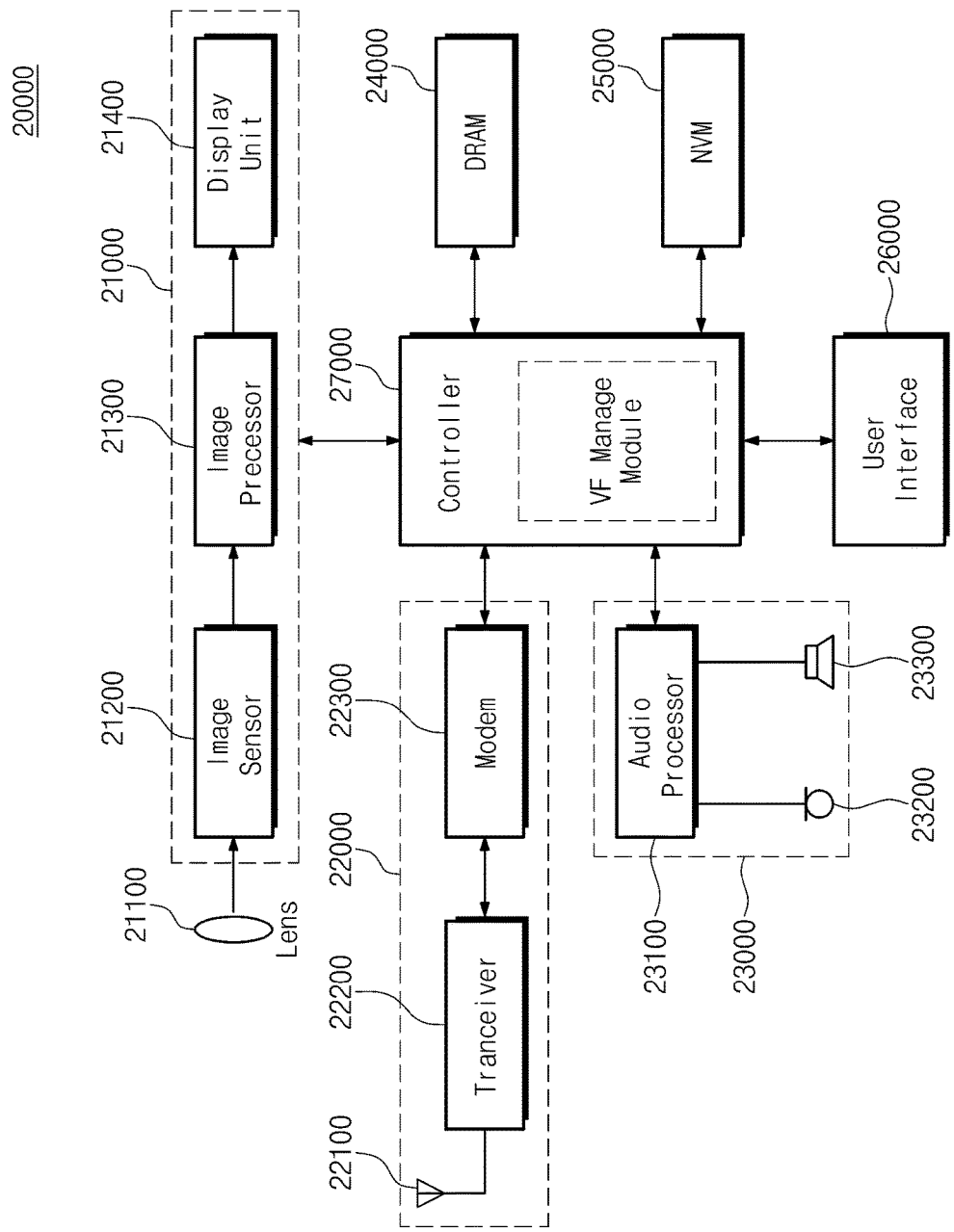
FIG. 13 is a block diagram illustrating a portable terminal including a memory system in accordance with at least one example embodiment of the inventive concepts.

FIG. 13 is a block diagram illustrating a portable terminal including a memory system in accordance with at least one example embodiment of the inventive concepts. A portable terminal 20000 may include an image processing unit 21000, a wireless transmit/receive unit 22000, an audio processing unit 23000, a DRAM 24000, a nonvolatile memory device 25000, a user interface 26000 and a controller 27000.

The image processing unit 21000 may include a lens 21100, an image sensor 21200, an image processor 21300 and a display unit 21400. The wireless transmit/receive unit 22000 may include an antenna 22100, a RF unit 22200, and a modem 22300. The audio processing unit 23000 may include an audio processor 21300, a mike 23200 and a speaker 23300. The DRAM 24000 can temporarily store data processed by the portable terminal 20000. The nonvolatile memory device 25000 may be provided as a memory card (for example, MultiMediaCard (MMC), embedded MMC (eMMC), micro SD, and the like).

The controller 27000 may be provided as a system on chip SoC driving an application program, an operating system, etc. The controller 27000 may include a VF management module to support a queue based management module and a virtualization function. A kernel of an operating system being driven in the system on chip SoC may further include a device driver for controlling an input/output scheduler and the nonvolatile memory device 25000. The device driver can control access performance of the nonvolatile memory device 25000 or a CPU mode, a dynamic voltage and frequency scanning (DVFS) level inside the SoC with reference to the number of synchronous queues being managed by the input/output scheduler.

The nonvolatile memory device and/or the memory controller may be mounted using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

The storage device and the user device in accordance with at least some example embodiments of the inventive concepts can effectively provide a queue based interface scheme and a virtual function to improve an operating speed and increase resource utilization efficiency.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A storage device comprising:
a plurality of nonvolatile memories; and
a storage controller which is connected to the nonvolatile memories and controls the nonvolatile memories,
wherein the storage controller is configured to,
perform an interface operation based on a queue-based command exchange scheme with a host,
access a plurality of administrator queues of the host corresponding, respectively, to a plurality of virtualization functions of the host,
access a plurality of input/output submission queues of the host corresponding, respectively, to the plurality of virtualization functions of the host, and
access a plurality of input/output completion queues of the host corresponding, respectively, to the plurality of virtualization functions of the host,
wherein the number of the plurality of administrator queues depends on the number of the plurality of virtualization functions,
wherein the storage controller comprises a plurality of fetchers that correspond, respectively, to the plurality of virtualization functions,
each one of the plurality of fetchers being configured to fetch administrator submission queue information of the corresponding virtualization function and input/output submission queue information of the corresponding virtualization function,
wherein, the plurality of fetchers are configured such that, in response to a doorbell signal received from the host, the plurality of fetchers access a host memory of the host, and
wherein, for each one of the plurality of fetchers, the host memory accessed is a memory storing the administrator submission queue information of the corresponding virtualization function and the input/output submission queue information of the corresponding virtualization function.

2. The storage device of claim 1, wherein the storage controller further comprises a plurality of parsers connected to the plurality of fetchers, the plurality of parsers being configured to analyze administrator submission queue information corresponding to the plurality of fetchers and input/output submission queue information corresponding to the plurality of fetchers.

3. The storage device of claim 2, wherein the storage controller further comprises:
a dispatcher connected to the plurality of parsers in common; and
a plurality of cores,
wherein the dispatcher is configured to receive a plurality of administrator submission queue information or a plurality of input/output submission queue information from the parsers and allocate the administrator submission queue information or the input/output submission queue information to the cores so that the cores operate in parallel.

4. The storage device of claim 3, wherein the storage controller further comprises:

a DMA unit configured to control read and write operations; and
a plurality of cache memories connected to the plurality of cores respectively,
wherein the cache memories include command information for controlling administrator submission queue information or input/output submission queue information allocated to a corresponding core to be processed by the DMA unit.

5. The storage device of claim 3, wherein the storage controller further comprises:
a DMA unit configured to control a processing operation with respect to the administrator submission queue information or the input/output submission queue information; and
a common response manager connected to the DMA unit,
wherein the common response manager is configured to receive a plurality of administrator completion queue information including information about a processing result of the administrator submission queue information or a plurality of input/output completion queue information including information about a processing result of the input/output submission queue information from the DMA unit.

6. The storage device of claim 5, wherein the storage controller further comprises a plurality of responsers connected to the common response manager, the plurality of responsers corresponding to the plurality of virtualization functions of the host respectively,
wherein the common response manager distributes the administrator completion queue information or the input/output completion queue information to corresponding responsers among the plurality of responsers.

7. The storage device of claim 6, wherein the responsers are configured to write information about an administrator completion queue or information about an input/output completion queue received from the common response manager in a host memory of the host.

8. The storage device of claim 1, wherein the storage controller is configured to perform an interface operation with respect to the host by a NVMe scheme.

9. The storage device of claim 1, wherein the host is configured to implement the plurality of virtualization functions by a SR-IOV scheme.

10. The storage device of claim 1, wherein the storage controller comprises a plurality of fetchers configured to fetch administrator submission queue information or input/output submission queue information with respect to the plurality of virtualization functions,
wherein at least one of the plurality of fetchers is configured to fetch a command from an administrator submission queue or an input/output submission queue with respect to at least two virtualization functions among the plurality of virtualization functions.

11. The storage device of claim 1, wherein the storage controller further comprises:
a plurality of fetchers configured to fetch administrator submission queue Information or input/output submission queue information with respect to the plurality of virtualization functions; and
a register including address information of a host memory with respect to the administrator submission queue information or the input/output submission queue information.

12. The storage device of claim 11, wherein the register stores a producer index corresponding to the administrator submission queue information or a producer index and a completion index corresponding to the input/output submission queue information.

13. The storage device of claim 1, wherein at least one of the plurality of nonvolatile memories is a three-dimensional nonvolatile memory.

14. A host device comprising:
at least one processing core configured to implement a physical function and a plurality of virtualization functions in accordance with an I/O virtualization (IOV) scheme;
a memory storing a plurality of administrator queue areas and a plurality of input/output queue areas,
the plurality of administrator queue areas including, for each function from among the plurality of virtualization functions and the physical function, respectively, at least one administrator queue,
the plurality of input/output queue areas including, for each function from among the plurality of virtualization functions and the physical function, respectively, at least an input/output submission queue and an input/output completion queue; and
a root complex configured to connect the at least one processing core to the memory,
wherein each of the plurality of virtualization functions is configured to perform a queue management operation based on a corresponding administrator queue area of the plurality of administrator queue areas,
wherein the memory is configured to be accessed by a storage controller,
the storage controller including a plurality of fetchers that correspond, respectively, to the plurality of virtualization functions,
each one of the plurality of fetchers being configured to fetch administrator submission queue information of the corresponding virtualization function and input/output submission queue information of the corresponding virtualization function,
the plurality of fetchers being configured to access the memory in response to a doorbell signal received from the host such that, for each one of the plurality of fetchers, accessing the memory includes accessing an administrator queue area storing the administrator submission queue information of the corresponding virtualization function and accessing input/output queue areas storing the input/output submission queue information of the corresponding virtualization function.

15. The host device of claim 14, wherein the plurality of administrator queue areas includes, for each function from among the plurality of virtualization functions and the physical function, respectively, at least one administrator submission queue and one administrator completion queue.

16. The host device of claim 14, wherein the IOV scheme is a single root IOV (SR-IOV) scheme.

* * * * *